United States Patent
Klejsa et al.

(10) Patent No.: US 12,494,216 B2
(45) Date of Patent: Dec. 9, 2025

(54) SIGNAL CODING USING A GENERATIVE MODEL AND LATENT DOMAIN QUANTIZATION

(71) Applicant: DOLBY INTERNATIONAL AB, Dublin (IE)

(72) Inventors: Janusz Klejsa, Solna (SE); Lars Villemoes, Järfälla (SE); Per Hedelin, Gothenburg (SE)

(73) Assignee: DOLBY INTERNATIONAL AB, Dublin (IE)

( * ) Notice: Subject to any disclaimer, the term of this patent is extended or adjusted under 35 U.S.C. 154(b) by 112 days.

(21) Appl. No.: 18/247,555

(22) PCT Filed: Oct. 11, 2021

(86) PCT No.: PCT/EP2021/078053
§ 371 (c)(1),
(2) Date: Mar. 31, 2023

(87) PCT Pub. No.: WO2022/078960
PCT Pub. Date: Apr. 21, 2022

(65) Prior Publication Data
US 2024/0013797 A1    Jan. 11, 2024

Related U.S. Application Data

(60) Provisional application No. 63/092,642, filed on Oct. 16, 2020.

(51) Int. Cl.
*G10L 19/16* (2013.01)
*G10L 19/002* (2013.01)
(52) U.S. Cl.
CPC .......... *G10L 19/167* (2013.01); *G10L 19/002* (2013.01)

(58) Field of Classification Search
CPC ..... G10L 19/167; G10L 19/002; G10L 19/02; G10L 7/01; G06N 3/045; G06N 3/047; G06N 3/088
See application file for complete search history.

(56) References Cited

U.S. PATENT DOCUMENTS

| | | |
|---|---|---|
| 10,635,413 B1 | 4/2020 | Krishnamoorthy |
| 2016/0292589 A1 | 10/2016 | Taylor, Jr. |

(Continued)

FOREIGN PATENT DOCUMENTS

| | | |
|---|---|---|
| JP | 2022552319 A | 12/2022 |
| WO | 2019157228 A1 | 8/2019 |

(Continued)

OTHER PUBLICATIONS

Hoogeboom, Emiel, et al. "Integer discrete flows and lossless compression." Advances in Neural Information Processing Systems 32 (2019). (Year: 2019).*

(Continued)

*Primary Examiner* — Anne L Thomas-Homescu

(57) ABSTRACT

The present disclosure provides a decoder configured to receive a finite bitrate stream that includes a quantized latent frame, where the quantized latent frame includes a quantized representation of a current frame of a signal in a latent domain different from a first domain; to generate a reconstructed latent frame from the quantized latent frame; to use a generative neural network model to perform a task for which the general neural network model has been trained, wherein the task includes to generate parameters for an invertible mapping from the latent domain to the first domain; to reconstruct a current frame of the signal in the first domain, which includes to map the reconstructed latent frame to the first domain by use of the invertible mapping, and to use the reconstructed current frame of the signal in the (Continued)

first domain to update a state of the generative neural network model.

19 Claims, 4 Drawing Sheets

(56) References Cited

U.S. PATENT DOCUMENTS

| | | | |
|---|---|---|---|
| 2018/0137941 A1 | 5/2018 | Chen |
| 2019/0318040 A1 | 10/2019 | Chaudhury |
| 2020/0027247 A1 | 1/2020 | Minnen |
| 2020/0090069 A1 | 3/2020 | Mandt |
| 2020/0107023 A1 | 4/2020 | Lee |
| 2020/0160565 A1 | 5/2020 | Ma |
| 2020/0176004 A1 | 6/2020 | Kleijn |

FOREIGN PATENT DOCUMENTS

| | | |
|---|---|---|
| WO | 2019157462 A1 | 8/2019 |
| WO | 2019177951 A1 | 9/2019 |

OTHER PUBLICATIONS

Grover, A., et al., "AlignFlow: Cycle Consistent Learning from Multiple Domains via Normalizing Flows", arixv.org, Cornell University Library, XP081365904, May 30, 2019.

Hoogeboom, E., et al., "Integer Discrete Flows and Lossless Compression", 33rd Conference NeurIPS, May 17, 2019, Vancouver, Canada.

Liu, B., et al., "Unified Signal Compression Using Generative Adversarial Networks", IEEE International Conference on Acoustics, Speech and Signal Processing (ICASSP), 2020, pp. 3177-3181, Barcelona, Spain.

Purwins, H. et al "Deep Learning for Audio Signal Processing" IEEE Journal of Selected Topics in Signal Processing, vol. 13, No. 2, May 2019, pp. 206-219.

Tiao, L., et al., "Cycle-Consistent Adversarial Learning as Approximate Bayesian Inference", ICML 2018 Workshop, 2018, Stockholm, Sweden.

\* cited by examiner

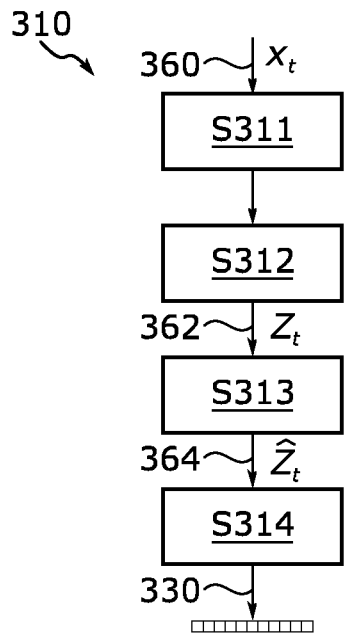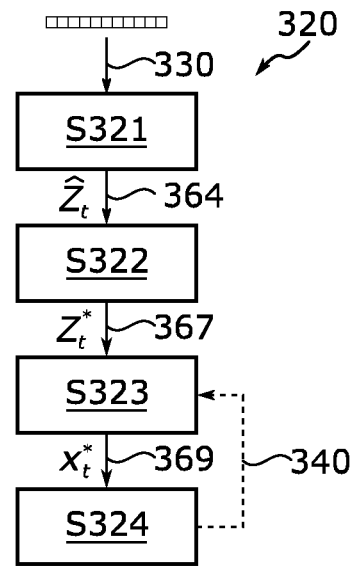
*Fig. 3a*   *Fig. 3b*
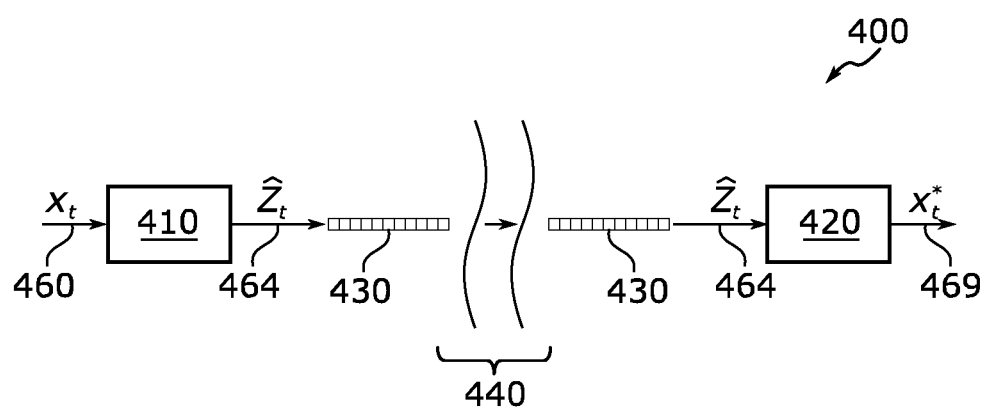
*Fig. 4*

SIGNAL CODING USING A GENERATIVE MODEL AND LATENT DOMAIN QUANTIZATION

CROSS-REFERENCE TO RELATED APPLICATIONS

This application is a U.S. National Stage application under U.S.C. 371 of International Application No. PCT/EP2021/078053, filed on 11 Oct. 2021 (reference: D20048WO01), which claims the priority of the following priority application: U.S. provisional application 63/092,642, filed 16 Oct. 2020 and European application 21151296.7, filed 13 Jan. 2021, each of which are hereby incorporated by reference in their entireties.

TECHNICAL FIELD

The present disclosure relates to the field of signal coding. In particular, the present disclosure relates to signal coding using a generative model and latent domain quantization.

BACKGROUND

Generative models implemented using (deep) neural networks have proven their usefulness in tasks involving signal synthesis. An example of such a task is audio coding, including e.g. decoding where an audio signal is reconstructed based on a finite bitrate representation thereof provided by a corresponding encoder. In such a coding task, generative models may perform signal reconstruction by implementing a conditional probability distribution function meant to represent the audio signal and then reconstruct the signal according to this distribution. The probability distribution function may be conditioned on one or more previously reconstructed frames of the audio signal. Furthermore, additional conditioning information is often provided in a finite bitrate representation and is typically periodically updated to reflect the variability of the signal, for example once every frame of the signal.

Audio signals may however be difficult to model, and, at least in some situations and even when additional conditioning information is provided, it may not be possible to train an efficient generative model (due to for example complexity constraints, availability of training data, and/or limitations of the specific algorithm employed by the generative model). In some situations, the generative model will thus only approximate the true unknown model, which may lead to a modelling mismatch.

In light of the above, there is therefore a need for an improved, generative model-based coding scheme.

SUMMARY

A goal of the present disclosure is therefore to at least partly satisfy the above identified need.

According to a first aspect of the present disclosure, a decoder is provided. The decoder is configured to receive a finite bitrate stream that includes a quantized latent frame. The quantized latent frame includes a quantized representation of a current frame of a signal in a latent domain. The latent domain is different from a first domain. The decoder is configured to generate a reconstructed latent frame from the quantized latent frame. The decoder is configured to use a generative neural network model (hereinafter "the model") to perform a task for which the model has been trained. The task includes generating parameters for an invertible mapping from the latent domain to the first domain. The decoder is configured to reconstruct a current frame of the signal in the first domain, which includes mapping the reconstructed latent frame to the first domain by use of the invertible mapping. The decoder is further configured to use the reconstructed current frame of the signal in the first domain to update a state of the generative neural network model (such that the model is then ready to process a next, future frame of the signal).

According to a second aspect of the present disclosure, an encoder is provided. The encoder is configured to receive a current frame of a signal in a first domain. The encoder is configured to use a (generative neural network) model to perform a task for which the model has been trained. The task includes to provide parameters for an invertible mapping from the first domain to a latent domain. The latent domain is different from the first domain. The encoder is configured to generate a latent frame by mapping at least part of the current frame of the signal to the latent domain by use of the invertible mapping. The latent frame includes a representation of the current frame of the signal in the latent domain. The encoder is configured to generate a quantized latent frame based on the generated latent frame. The encoder is further configured to generate a finite bitrate stream that includes the quantized latent frame.

According to a third aspect of the present disclosure, a method of decoding a current frame of a signal is provided. The method includes the steps performed by the decoder recited above according to the first aspect.

According to a fourth aspect of the present disclosure, a method of encoding a current frame of a signal is provided. The method includes the steps performed by the encoder recited above according to the second aspect.

According to a fifth and sixth aspect of the present disclosure, a respective non-transitory computer readable medium is provided. Each medium stores instructions operable, when executed by at least one computer processor belonging to a computer hardware, to cause the computer hardware to perform the method of encoding and/or decoding a current frame of a signal as recited above according to the third and fourth aspects, respectively.

According to a seventh aspect of the present disclosure, a coding system for transferring a current frame of a signal is provided. The coding system includes at least one encoder as recited above according to the first aspect and at least one decoder as recited above according to the second aspect. The coding system further includes means for transferring a finite bitrate stream that includes the quantized latent frame between the encoder and the decoder.

Audio signals may be difficult to model, and, at least in some situations, it may not be possible to train an efficient generative model (due to for example complexity constraints, availability of training data, and/or limitations of the specific algorithm employed by the generative model). In some situations, the generative model will thus only approximate the true unknown model, which may lead to a modelling mismatch.

In many state-of-the-art systems using such generative models for coding, the utilized coding schemes additionally include spending the full bit budget on the transferring of conditioning information between an encoder and a decoder. The present disclosure improves upon the state-of-the-art by providing a coding scheme wherein one or more bits in a bitstream transferred between an encoder and a decoder are instead allocated for conveying a quantized latent frame. This quantized latent frame may allow to make it possible to code one or more aspects of a signal that is otherwise unexplained by the generative model. This may help to achieve rate-distortion scalability of the coding scheme using the generative model, by facilitating a flexible rate-distortion trade-off, and to deal with modelling mismatch by facilitating coding in the latent domain. As will be described later herein in more detail, the present disclosure may also provide e.g. a generative model trained for zero bit-rate conditioning, resulting in a coding scheme with the entire bit budget instead allocated to the quantized latent frame. If e.g. the latent variables are sent in packets, such a coding scheme may facilitate packet loss concealment, as the model may be trained to replace such lost packets by synthetically reconstructed latent variables. In addition, an encoder implementing a generative model trained for zero bit-rate conditioning may not require an additional coding delay that may otherwise by needed for estimating the conditioning variables. Such a coding scheme may for example be useful in low delay coding, such as e.g. for low delay transfer of speech or audio.

The present disclosure relates to all possible combinations of features recited in the claims. Objects and features described according to the first aspect may be combinable with, or replaced by, objects and features described according to the second aspect, the third aspect, and/or the fourth aspect, and vice versa.

Further objects and advantages of the various embodiments of the present disclosure will be described below by means of exemplifying embodiments.

BRIEF DESCRIPTION OF THE DRAWINGS

Exemplifying embodiments will be described below with reference to the accompanying drawings, in which:

FIGS. 3a and 3b schematically illustrates flows of various embodiments of methods of encoding and decoding, respectively, according to the present disclosure, and FIG. 4 illustrates schematically an embodiment of a coding system according to the present disclosure.

Figure 1A:
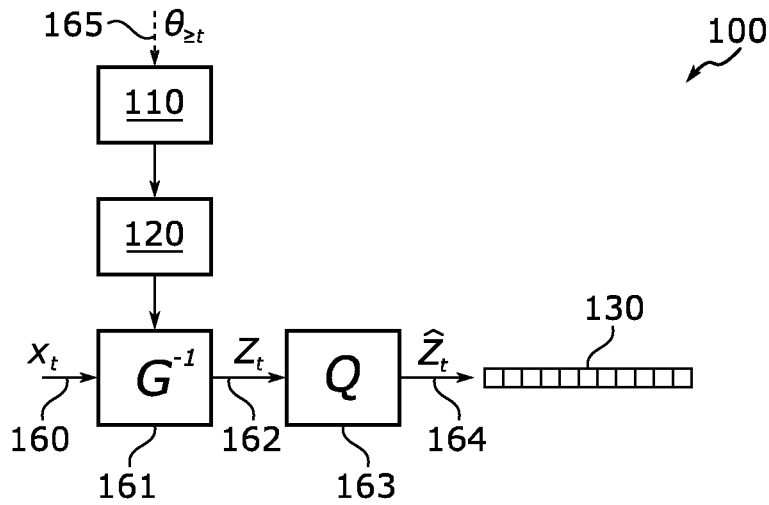
FIGS. 1a, 1b, 1c, 1d and 1e schematically illustrate various embodiments of an encoder according to the present disclosure.

In the drawings, like reference numerals will be used for like elements unless stated otherwise. Unless explicitly stated to the contrary, the drawings show only such elements that are suffices to illustrate the example embodiments, while other elements, in the interest of clarity, may be omitted or merely suggested.

DETAILED DESCRIPTION

Elements of a coding scheme as envisaged by the present disclosure will now be described in more detail.

As a starting example, it may be assumed that $x_t$ is an N-dimensional vector that represents a signal sample frame at a time t and that such a vector $x_t$ is a realization of some unknown random variable X. Here, N may for example be equal to a number of samples/channels/bands, a length of a signal transform, or for example a number of audio channels sampled in a time-domain, or similar. A probabilistic model implemented by the neural network may operate according to the probability density function $$f_X(x) = \prod_{t=0}^{T-1} f(x_t|x_0, x_1, \ldots, x_{t-1}) = \prod_{t=0}^{T-1} f(x_t | x_{<t}), \quad (1)$$

where $x_{<t}$ is a shorthand notation for (vector) samples $x_0, x_1, \ldots, x_{t-1}$ previous to the current sample $x_t$, and where T is a total number of samples. In case the signal samples are blocked into one or more frame, the above index t may then be assumed to represent the t:th frame, and T corresponding to the total number of frames. In all embodiments described herein, if not explicitly stated to the contrary, it may be assumed that a frame may include only a single (vector) sample, and that in such a situation the terms sample and frame may be used interchangeably.

In general, the generative model may also be conditioned on some conditioning information $\theta_{\geq t}$ for the current and/or one or more future frames, in which case it implements a conditional probability density function $$f_X(x) = \prod_{t=0}^{T-1} f(x_t|x_{<t}; \theta_{\geq t}). \quad (2)$$

In what follows, to simplify notation, such additional conditioning information will be omitted from the descript unless explicitly stated to the contrary.

The above formulation implies that consecutive (vector) samples are conditionally independent. However, the components of each N-dimensional vector may still be correlated (within that vector). The conditional probability distribution at time t can for example conveniently be parametrized using a Gaussian mixture model (GMM), according to $$f(x_t|x_{<t}) = \sum_{j=0}^{J-1} w_j \mathcal{N}(x_t; \mu_t^{(j)}, \Sigma_t^{(j)}), \quad (3)$$

where $w\_j$, $\mu_t^{(j)}$ and $\Sigma_t^{(j)}$ are the mixture components, the means, and covariance matrices, respectively, as provided by the neural network, and where J is the total number of components in the mixture model.

A practical challenge may relate to the fact that the neural network must provide a proper estimate of the (positive semidefinite) covariance matrices. One envisaged example of how to achieve this is by using a Cholesky decomposition of a covariance matrix (which only exists for positive semidefinite matrices). In such a case, $$\Sigma = LL^T, \quad (4)$$

where L is a lower triangular matrix, and where e.g. indices t and (j) has been dropped for the sake of brevity. The usage of such a lower triangular matrix may also be useful in the case where the number of parameters is restricted. It is to be noted that $\Sigma$ is not the covariance of the signal x, but rather represents an uncertainty of the predictor at a given time instance. The present disclosure suggests allowing for a form of $\Sigma$ having more than one diagonal, in order to facilitate generation of dependencies among samples synthesized in e.g. individual channels/bands.

It is noted also that other factorizations may be used instead of a Cholesky decomposition. For example, it is envisaged also to use the factorization $\Sigma = LDL^T$, where D is a diagonal matrix, or the factorization $\Sigma = UDU^T$, where U is orthonormal and D is diagonal. The orthonormality constraint in such a factorization may be enforced by further decomposing U into a sequence of elementary Givens rotations, or Hausholder transforms.

It is further envisaged that, in practice, a full lower triangular matrix L is not needed. It may for example be possible to limit the number of parameters output by the model by restricting the number of diagonals of the triangular matrix. In some embodiments, it is envisaged that the matrix L may even be diagonal (i.e. including non-finite elements only on its main diagonal).

While the formula provided by equation (3) represents a Gaussian mixture model, it is noted that the concept as provided by the present disclosure may be further generalized also to a scenario wherein the output stage includes a plurality of invertible mappings, wherein each such mapping is associated with a parameter $w_j$ estimated by the generative model. This parameter may then be used for computation of a latent vector (frame). For example, in the case of a Gaussian mixture model, $w_j$ may have a meaning of component probability (component weight); and a single model component may be selected randomly according to the probabilities $w_0, w_1, \ldots, w_J$. In other embodiments, $w_j$ may still represent component probability, but it is envisaged to instead use e.g. a maximum likelihood principle for component selection. In general, it is envisaged that the generative model has been trained to provide the parameters needed for any of the above factorizations/decompositions of $\Sigma$.

Various example embodiments of e.g. encoders according to the present disclosure will now be described in more detail with reference to FIGS. 1a-1e.

FIG. 1a schematically illustrates an encoder 100, wherein a generative model 110 (implemented using e.g. a deep neural network) has been trained to perform the task of providing parameters 120 for an invertible mapping 161 ($G^{-1}$).

The encoder 100 also receives a current frame 160 ($x_t$) of a signal, which as described earlier herein may include a single or multiple (vector) samples of a signal. The current frame $x_t$ is a representation of the signal in a first domain, which may for example be a time/signal-domain (e.g. related to pulse-code modulation, PCM), a filter-bank domain (e.g. related to one or more quadrature mirror filters, QMFs), a transform-domain (e.g. related to one or more modified discrete cosine transforms, MDCTs), or even a processed transform-domain (e.g. related to one or more flattened MDCTs). Other domain representations are also envisaged as possible.

The invertible mapping $G^{-1}$ 161 is such that the encoder 100 may use this mapping to map at least part of the current frame $x_t$ of the signal from the first domain into a latent domain, thereby producing a latent frame 162 ($Z_t$). This latent frame $Z_t$ includes a representation of the current frame t of the signal in the latent domain. Using a quantization operation 163 (Q), the encoder 100 quantizes the latent frame $Z_t$ into a quantized latent frame 164 ($\hat{Z}_t$). Finally, the encoder 100 is configured to generate and output a finite bitrate stream 130 which includes the quantized latent frame $\hat{Z}_t$.

Figure 1B:
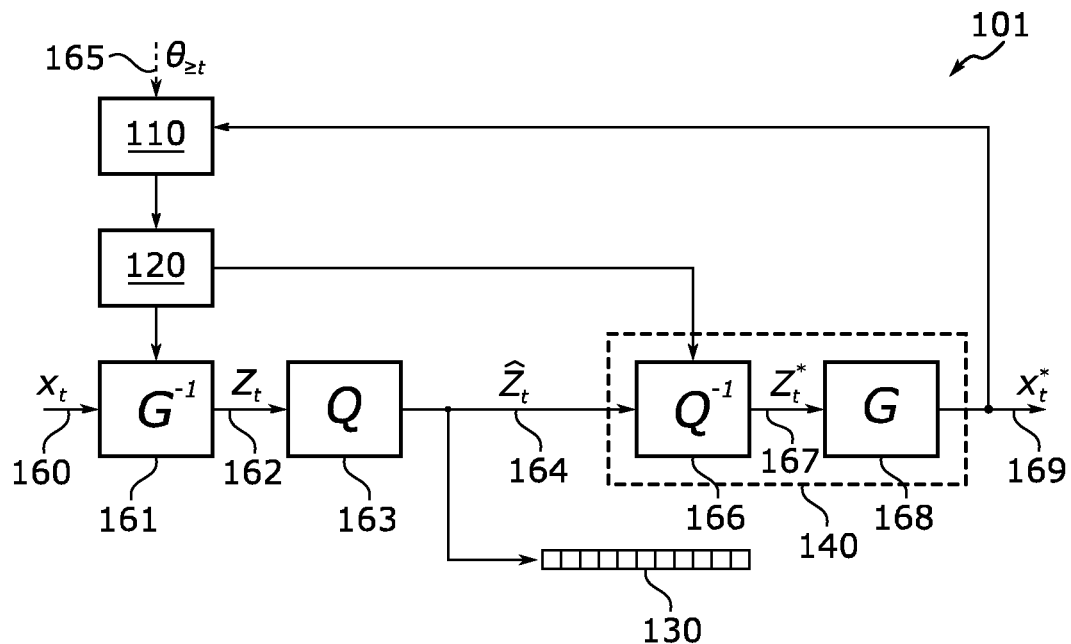

FIG. 1b schematically illustrates a slightly different encoder 101, wherein at least the generative model 110 the parameters 120 the invertible mapping $G^{-1}$ 161, the quantization operation Q 163 may be used just as for the encoder 100 described with reference to FIG. 1a, and all help to map the signal frame $x_t$ from the first domain to the latent domain, and to quantize the latent frame $Z_t$ 162 and output the quantized latent frame $\hat{Z}_t$ 164 in a finite bitrate stream 130. In addition, however, the encoder 101 also has a local decoder part 140, which takes as input the quantized latent frame $\hat{Z}_t$ 164 (as e.g. provided in the bitstream 130), uses a dequantization operation 166 ($Q^{-1}$) to produce a reconstructed latent frame 167 ($Z^*_t$), and then applies an inverse 168 (G) of the invertible mapping $G^{-1}$ in order to generate a reconstructed signal frame 169 ($x^*_t$) in the first domain. This reconstructed signal frame $x^*_t$ is then fed back to the generative model 110 and used to update a state of the generative model such that it is ready to process a next frame t+1. Just as described earlier, the generative model 110 may also, in some embodiments, receive (additional) conditioning information 165 ($\theta_{\geq t}$) for either one or both of the current frame t and (one or more) future frames >t.

Figure 1C:
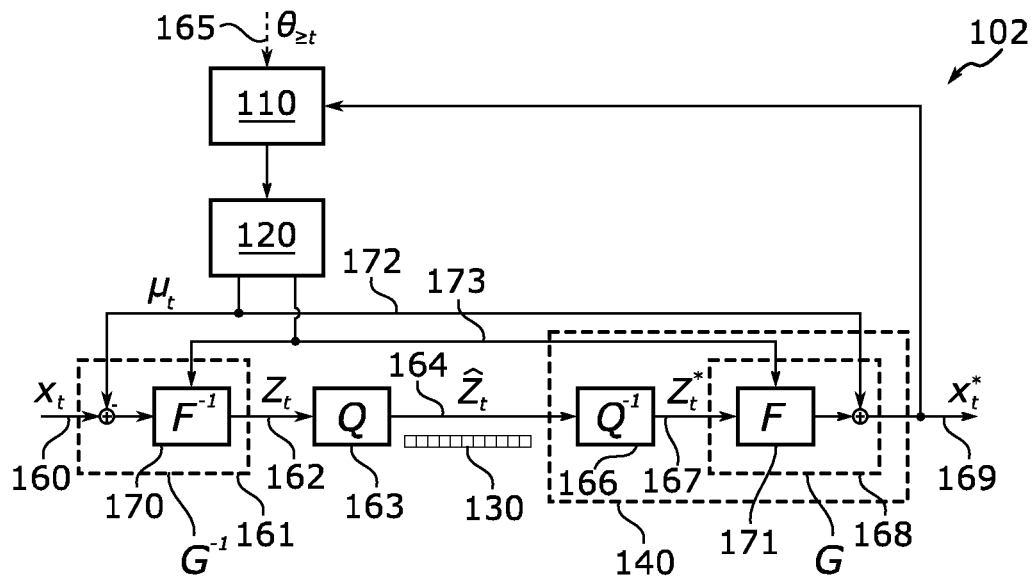
Figure 1D:
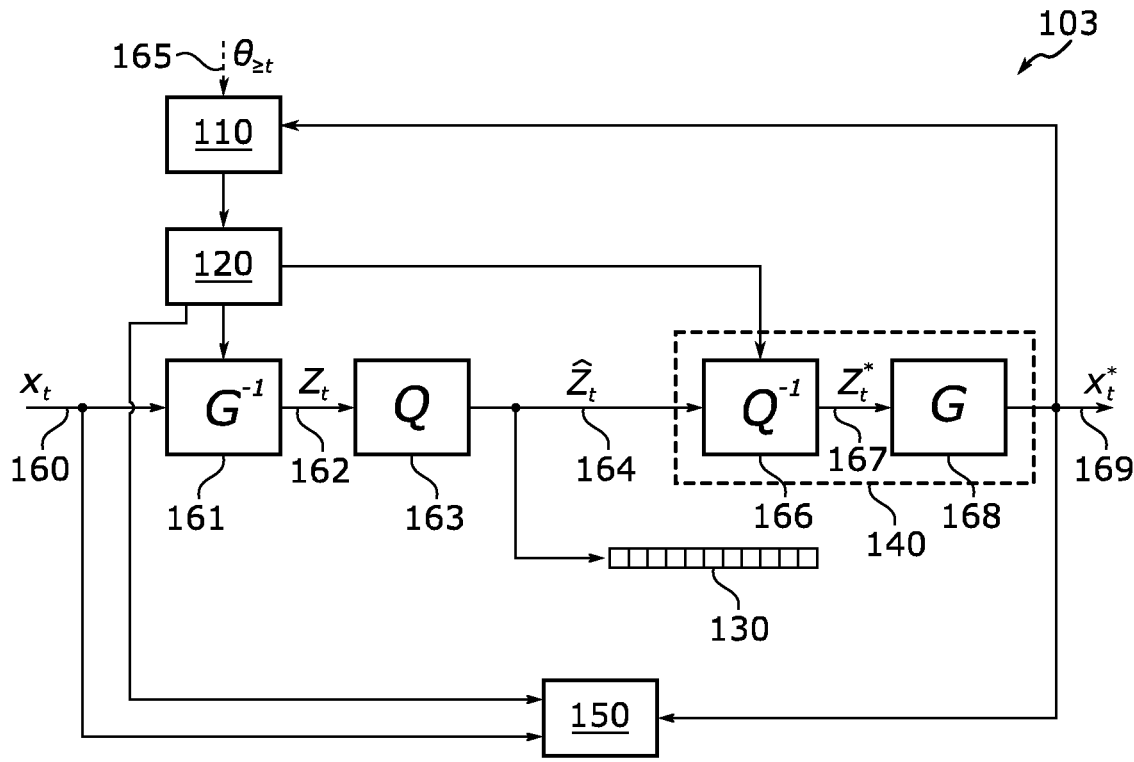
Figure 1E:
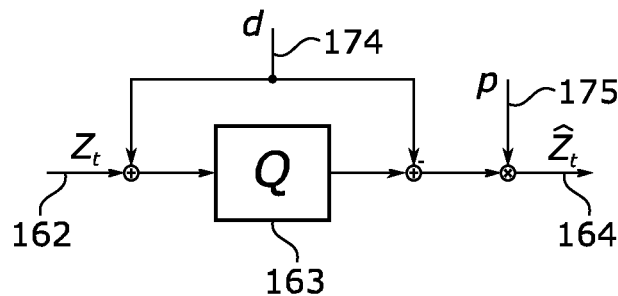

FIG. 1c schematically illustrates an encoder 102 which, like the encoder 101 described with reference to FIG. 1b, includes a local decoder 140. Here, the invertible mapping $G^{-1}$ is an affine mapping which includes subtracting a predicted signal frame mean 172 ($\mu_t$) from the input signal frame $x_t$, followed by an invertible transform 170 ($F^{-1}$) which may for example include a scaling according to the parameters used to define E, such as e.g. the matrix/matrices $L_j$, i.e. at least a subset 273 of the parameters 220 provided by the model 210. In other embodiments, the invertible mapping $G^{-1}$ is not necessarily linear.

After the affine mapping, the latent frame $Z_t$ is quantized by the operation Q to produce a quantized latent frame $\hat{Z}_t$, which is then provided in the finite bitrate stream 130 to e.g. a decoder. As described earlier, the encoder 102 includes a local decoder 140 which outputs a reconstructed current signal frame $x^*_t$, which is fed back to and used to update the state of the model 110. In the local decoder 140 the inverse G of the invertible mapping $G^{-1}$ is implemented using an inverse 171 (F) of the invertible transform $F^{-1}$.

As described earlier herein, in some embodiments, the encoders as described herein may have available a plurality of different invertible mappings to select from. For example, if using a Gaussian mixture model, a plurality of sets of parameters $\{w_j, \mu_j, L_j\}$ may be generated by the model, and the exact mapping to use may be selected according to the probabilities $w_j$. In other embodiments, where the mixture model is not necessarily Gaussian, $w_j$ may still be assumed to represent mapping probability, and the exact mapping to use may be selected using e.g. a maximum likelihood principle.

As illustrated at least in FIGS. 1a, 1b and 1c, the model 110 may also, in some embodiments, receive additional conditioning information $\theta_{\geq t}$ associated with at least one of the current frame t and a future frame >t, and the model may be trained to perform its task (i.e. including providing parameters for the invertible mapping $G^{-1}$ based on such conditioning information. Using one or more "look-ahead" frames of conditioning information may for example further improve coding quality, at the cost of an increase of an introduced delay in the coding/decoding process. In general, if additional conditioning information $\theta$ is used, the encoders as described herein may be configured to also output a finite bitrate stream which includes the conditioning information, such that it may be provided to e.g. a decoder. The conditioning information $\theta_{\geq t}$ provided to the generative model 110 may or may not be quantized, depending on the exact content of the conditioning information. Such conditioning information may for example include a parametric description of the signal; a waveform approximation to the coded signal encoded at finite bitrate; and/or an indication of a signal category (e.g. speech, general audio, music, certain types of music, such as e.g. piano music, etc.).

In some embodiments, the encoder as described herein may be further configured to output a same finite bitrate stream which includes the quantized latent frame, and either conditioning information associated with a) at least one of the current frame and a future frame (as described above) or b) an indication that such conditioning information is not included in the same finite bitrate stream. The indication may help e.g. a decoder to understand whether the current frame includes conditioning information, or whether only quantized latent information is provided from the encoder side.

If using such a two-stage signal description, it is envisaged also that e.g. instead of explicitly providing the conditioning information in a first stage of the same finite bitrate stream, legacy codec data may be provided instead. A decoder as described herein may then generate conditioning information on its own, for example by reconstructing a signal from the legacy codec data, and then use such a reconstructed signal as at least part of a conditioning information. This may allow for construction of a bitstream that is decodable by a legacy decoder (e.g. by ignoring of the quantized latent from the bitstream). This may also allow for e.g. a decoder according to the present disclosure, i.e. as described herein, to operate in a backwards compatible manner and benefit also from legacy data. The encoder may for example be conditioned on the same legacy codec data, in order to generate the quantized latent frame which is provided in a second stage of the same finite bitrate stream. In addition, or instead of such waveform reconstruction, the legacy codec data may include other parameters for conditioning.

FIG. 1$d$ schematically illustrates another embodiment of an encoder 103. Here, a perceptual rate allocation 150 is used in order to decide the allocation of bits for the quantized latent frame $\hat{Z}_t$. During the encoding, the parameters of the invertible mapping (such as e.g. $\mu_t$ and the invertible L or $L_j$:s, as used in e.g. $F^{-1}$ and $G^{-1}$) are available to the encoder 103 and may be used to determine the rate allocation. As an example, it is envisaged to e.g. use L to estimate variances of the signal after subtraction of $\mu_t$. These variances may then be quantized with a 3 dB step. Thereafter, a collection of quantizers may be designed, providing 1.5 dB improvements in signal-to-noise ratio (SNR), followed by an exchange of 3 dB increments of variances into 1.5 dB improvements in SNR. In other embodiments, the box indicated with 150 could instead correspond to a different type of rate allocation. Envisaged examples include e.g. to allocate the bitrate of the finite bitrate stream 130 based on a difference between the received current frame of the signal, i.e. $x_t$, in the first domain and the reconstructed current frame of the signal, i.e. $x^*_t$, in the first domain. This could include e.g. the use of a sample distortion measure, such as e.g. (perceptually) weighted square error. In other embodiments, the rate allocation could be based on for example the output parameters 120 provided by generative model 110. For example, in the case of an affine mapping, the scales (e.g. as defined by L and $\Sigma$) could be used to distribute the bit rate for the quantized latent frame $\hat{Z}_t$.

As another example, in order to achieve intra-frame bit rate allocation, it is envisaged, in some embodiments, to use a plurality of quantizers with different quantization step-sizes. It is envisaged to also allow for quantization with zero bits (i.e. "infinite step-size"), which may imply that dimensions quantized with zero-bits may be replaced by a (pseudo) random realization drawn from e.g. an $\mathcal{N}(0,1)$ distribution. Phrased differently, the quantizer may select from a zero-rate noise-fill and a plurality of quantizers associated with different levels of SNR. For each coordinate of the latent frame, a quantizer is selected which is governed by the rate allocation. The rate allocation can e.g. be backward adaptive, when it is derived from parameters associated with the mapping G (or F), or it can be forward adaptive, when it involves an additional parameter that is derived on the encoder side and transmitted in the bitstream to a decoder.

FIG. 1$e$ schematically illustrates an example of a quantization operation as described herein. Here, the quantization operation (as used e.g. in any of the encoders 100, 101, 102 or 103) include using subtractive dithering followed by a gain. For example, a dither 174 ($d$) may be uniformly distributed as $d \sim U(-\Delta/2, \Delta/2)$, and added and subtracted before the quantization Q. The resulting output may be subject to a gain 175 ($p$), which may for example be defined as $p=1.01/\sqrt{1.0+\Delta^2/12}$. Other suitable forms of both dither and gain are of course also envisaged. Such an example of a quantization operation may facilitate reconstruction of a latent frame having approximately the same distribution as the distribution of the latent frame that was assumed during a training of the model. This may facilitate usage of the quantized latent frame to reconstruct the frame of the signal in the first domain, and to based thereon update the state of the model.

As the quantization structure just described may involve the use of subtractive dithering, pseudo-randomness may be needed in order to allow for encoder and decoder to operate in sync. This may be achieved e.g. by allowing both encoder and decoder (where the decoder may here be a decoder local to the encoder, as discussed earlier, and/or a remote decoder not forming part of the encoder as will be described later herein) access to a same source of randomness (i.e. a "common randomness"), or at least a same source of pseudo randomness. Here, a "same source" may not necessarily be a same physical or even logical source. It is envisaged that e.g. two separate random generators, using e.g. a same seed, may suffice. For example, there may be separate random number generators (implementing a same random number generation algorithm) which are initialized with the same seed. Similarly, the common randomness may also be used for the zero-rate noise fill, which may happen both on the encoder side (e.g. in a local decoder of an encoder) and on the remote decoder side.

In some embodiments of the encoders described herein, it is envisaged that the invertible mapping may be implemented by a neural network having an architecture that facilitates invertibility, and which enables training to model e.g. a multivariate distribution in the latent domain. An example of such a network is known as an (invertible flow). For example, the mappings G and $G^{-1}$ may be implemented using one or more flow models, with parameters controlled by the generative model This may especially be useful when the mappings are non-linear, and the flow structure allows to achieve invertibility for such mappings.

Various embodiments of decoders according to the present disclosure will now be described in more detail, with reference to FIGS. 2$a$ and 2$b$.

Figure 2A:
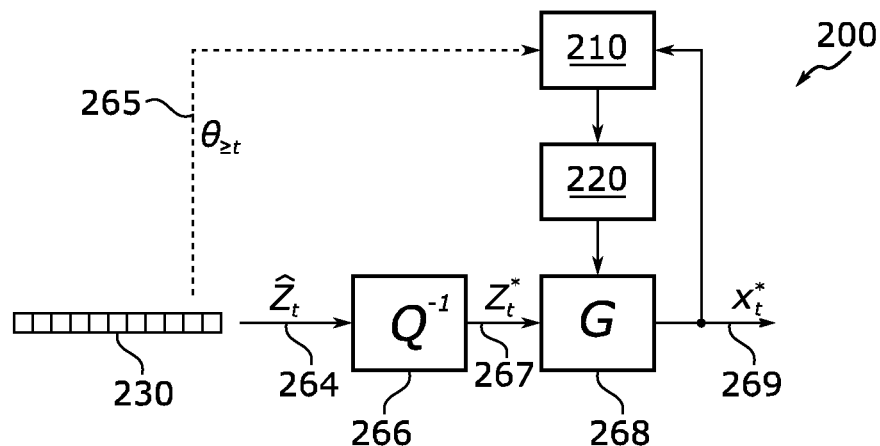
FIGS. 2a and 2b schematically illustrate various embodiments of a decoder according to the present disclosure.

FIG. 2$a$ schematically illustrates a decoder 200, which is configured to receive a finite bitrate stream 230 including a quantized latent frame 264 ($\hat{Z}_t$) which includes a quantized representation of a current frame t of a signal in a latent domain different from a first domain. Using a dequantization operation 266 ($Q^{-1}$) which operates on this quantized latent frame, the decoder 200 generates a reconstructed latent frame 267 ($Z^*_t$) from the quantized latent frame $\hat{Z}_t$. The decoder 200 includes a generative model 210, which has been trained for the task of generating parameters 220 for a mapping 268 (G) (i.e. the inverse of the invertible mapping $G^{-1}$ described earlier herein) from the latent domain to the first domain. This mapping G maps the reconstructed latent frame $Z^*_t$ to the first domain, to generate a reconstructed signal frame 269 ($x^*_t$). The reconstructed current frame of the signal $x^*_t$ is then used to update a state of the (generative neural network) model 210, such that the model 210 is prepared to process a future frame >t.

As has been described earlier herein, in some embodiments, the decoder 200 and other decoders of the present disclosure may be trained to perform the task of producing the parameters 220 also based on (additional) conditioning information 265 ($\theta_{\geq t}$). Such conditioning data may, as has also been described earlier herein, be associated with at least one of the current frame t and one or more future frames >t.

As described earlier herein, the quantized latent frame $\hat{Z}_t$ and the conditioning information $\theta_{\geq t}$ may be provided optionally in separate finite bitrate streams, or in a same finite bitrate stream as a two-stage description of the signal. If the conditioning information is not included, it is envisaged that the finite bitrate stream may then at least include an indication that the conditioning information is not included, such that the decoder may know what to expect and how to process the quantized latent frame using the generative model. For example, if the indication is there, the generative model may perform the task of producing the parameters without the use of such conditioning information. In some embodiments, when i.e. a legacy codec data is provided instead of actual conditioning information, the decoder may generate such conditioning information on its own using the legacy codec data (e.g. by waveform reconstruction or similar, or from other information provided in the legacy codec data).

In general, the task of generating/producing the parameters for the mapping G may include predicting a current frame of the signal in the first domain, and generating the current frame of the signal in the first domain may include correcting the predicted current frame by use of the reconstructed latent frame mapped to the first domain.

Figure 2B:
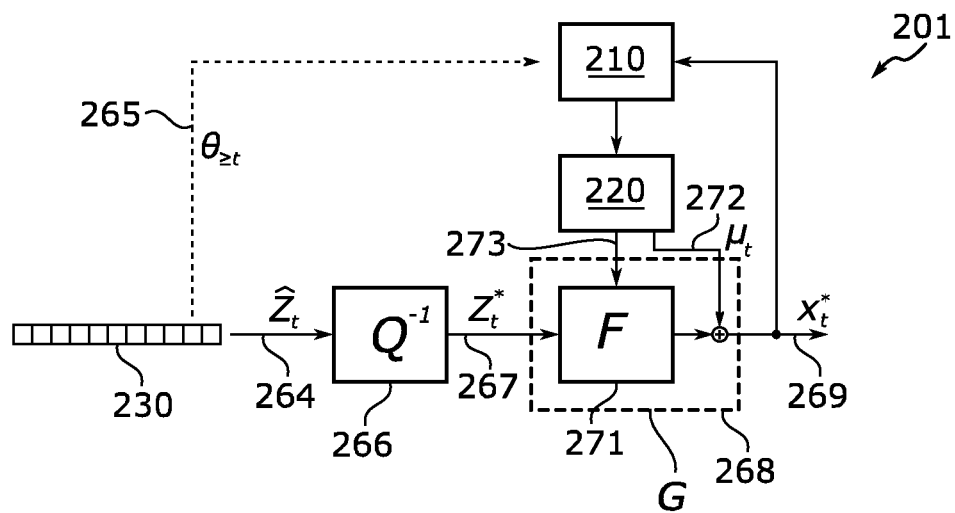

FIG. 2b schematically illustrates one embodiment of a decoder 201. Here, just as in the local decoder 140 of the encoder 101 described with reference to FIG. 1c, the mapping 268 (G) is affine and includes an invertible transform 271 (F) (corresponding to an inverse of the transform $F^{-1}$ used in the local decoder 140, and defined using e.g. a scaling according to at least a subset 273 of the parameters 220 provided by the model 210), followed by addition of a predicted mean 272 ($\mu_t$). The decoder 201 may for example be used together with the encoder 102 described with reference to FIG. 1c.

The present disclosure also provides a method of encoding a current frame of a signal, and a method of decoding a current frame of a signal. Embodiments of such methods will now be described in more detail with reference to FIGS. 3a and 3b.

FIG. 3a schematically illustrates an example flow of a method 310 of encoding a current frame of a signal. In a step S311, a current frame of a signal 360 ($x_t$) in a first domain is received. In a step S312, a generative neural network model is used, wherein the model has been trained to perform a task which includes providing parameters for an invertible mapping $G^{-1}$ from the first domain to a latent domain different from the first domain. In the step S312, using the generative model, at least a part of the current frame of the signal $x_t$ in the first domain is mapped to the latent domain using the invertible mapping $G^{-1}$, to produce a latent frame 362 ($Z_t$). The latent frame $Z_t$ includes a representation of the current frame of the signal in the latent domain. In a step S313, a quantized latent frame 364 ($\hat{Z}_t$) is generated based on the generated latent frame $Z_t$. In a step S314, a finite bitrate stream 330 is generated, which includes the quantized latent frame $\hat{Z}_t$.

FIG. 3b schematically illustrates an example flow of a method 320 of decoding a current frame of a signal. In a step S321, a finite bitrate stream 330 is received. The finite bitrate stream 330 includes a quantized latent frame $\hat{Z}_t$, which includes a quantized representation of the current frame of the signal in a latent domain which is different from the first domain. In a step S322, a reconstructed latent frame 367 ($Z^*_t$) is generated (by dequantization) from the quantized latent frame $\hat{Z}_t$. In a step S323, a generative neural network model is used, which has been trained to perform a task including to generate parameters for an invertible mapping G from the latent domain to the first domain. In the step S323, using the generative model, a reconstructed current frame of the signal 369 ($x^*_t$) in the first domain is generated, using the invertible mapping G. In a step S324, the reconstructed current frame of the signal $x^*_t$ in the first domain is then used to update a state of the generative model (as indicated by the dashed arrow 340).

It is envisaged that the methods 310 and 320 of encoding and decoding, respectively, may be modified in accordance with what has been described and/or discussed for any of the encoders and decoders as disclosed herein. For example, the generative models used in the methods 310 and 320 may use conditioning information, the encoding method 310 may include a local decoder as described with reference to FIG. 1b, etc. Phrased differently, it is envisaged that the flow of the respective method 310 and 320 may be modified to correspond to any embodiments of an encoder and decoder, respectively, as described herein.

The present disclosure also provides a respective non-transitory computer readable medium which stores instructions. These instructions, when executed by at least one computer processing which belongs to a computer hardware, are operable to cause the computer hardware to perform the method 310 and method 320, respectively, or any embodiment there of as described herein. Here, with "cause the computer hardware to perform" is meant that the computer processor may for example receive or output one or more signals using suitable interfaces provided by such computer hardware, and/or to perform any of the other method steps including e.g. using and implementing a generative neural network model by using e.g. the processor, storage or operating memory, etc., of the computer hardware in order to do so. Embodiments of such media are not illustrated in any Figures herein.

Finally, an embodiment of a coding system for transferring a current frame of a signal according to the present disclosure will now be described with reference to FIG. 4.

FIG. 4 illustrates schematically an example of a coding system 400. The coding system 400 includes at least one encoder 410, and at least one decoder 420. The encoder may receive a current frame of a signal 460 ($x_t$) in a first domain, and output at least one finite bitrate stream 430 which includes a quantized latent frame 464 ($\hat{Z}_t$) which includes a representation of the current frame of the signal in a latent domain which is different from the first domain. The coding system further includes means 440 for transferring the finite bitrate stream 430 between the encoder 410 and the decoder 420, such that the decoder 420 may receive the finite bitrate stream (including the quantized latent frame $\hat{Z}_t$, and based thereon generate a reconstructed current frame of the signal 469 ($x^*_t$) in the first domain. Here, the encoder and decoder may of course be any encoder and decoder, respectively, as described in the various embodiments present in the present disclosure. The means 440 may for example include a data link (e.g. an infrared link, a laser link, an optical link, radio link, etc.), or simply include means (such as various interfaces) with which the encoder 410 and decoder 420 can connect to an already existing communication infrastructure, including e.g. also the Internet, in order to transfer the finite bitrate stream 430.

In summary, the present disclosure provides a general concept wherein, instead of allocating a whole bit budget to transfer conditioning information for generative models, at least some bits are allocated to transfer a quantized latent. This may be achieved e.g. by using a two-stage description as described herein, wherein a rate allocation between the two components (conditioning information and quantized latent) may be arbitrary, and even include situations where all bits are instead used to transfer the quantized latent (which may be useful e.g. in low-rate transfer of speech and/or audio, then using only the quantized latent to reconstruct the signal on the decoding side). The present disclosure facilitates a coding arrangement where coding resources may be distributed between the two parts/stages of the signal description. Especially, the present disclosure provides a way of improving coding quality e.g. in situations where the generative models used cannot on their own accurately capture all features of an audio signal needed for adequate reconstruction on the decoder side, and instead allocate some bits to transfer a quantized latent which may help to "fill in the gaps" present in the generative model.

The various encoders and decoders of the present disclosure, as described in the above example embodiments, may for example be implemented using computer hardware, including e.g. a (computer) processor (e.g., a central processing unit (CPU), a graphics processing unit (GPU), a digital signal processor (DSP), one or more application specific integrated circuits (ASICs), one or more radio-frequency integrated circuits (RFICs), or any combination of these) and a memory coupled to the processor. As described above, the processor may be adapted to carry out some or all of the steps of the methods also described throughout the present disclosure.

The computer hardware may for example be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions (sequential or otherwise) that specify actions to be taken by that computer hardware. Further, the present disclosure shall relate to any collection of computer hardware that individually or jointly execute instructions to perform any one or more of the concepts discussed herein.

As used herein, the term "computer-readable medium" includes, but is not to be limited to, data repositories in the form of solid-state memories, optical media, and magnetic media, for example.

Unless specifically stated otherwise, as apparent from the following discussions, it is appreciated that throughout the disclosure discussions utilizing terms such as "processing", "computing", "calculating", "determining", "analyzing" or the like, refer to the action and/or processes of a computer hardware or computing system, or similar electronic computing devices, that manipulate and/or transform data represented as physical, such as electronic, quantities into other data similarly represented as physical quantities.

In a similar manner, the term "computer processor" may refer to any device or portion of a device that processes electronic data, e.g., from registers and/or memory to transform that electronic data into other electronic data that, e.g., may be stored in registers and/or memory. A "computer" or a "computing machine" or a "computing platform" or a "computer hardware" may include one or more processors.

The concepts described herein are, in one or more example embodiments, are performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system (i.e. a computer hardware) that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In some example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system/hardware executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to e.g. "one example embodiment", "some example embodiments" or "an example embodiment" means that a particular feature, structure or characteristic described in connection with the example embodiment is included in at least one example embodiment of the present disclosure. Thus, appearances of the phrases such as e.g. "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the present disclosure, various features of the disclosure are sometimes grouped together in a single example embodiment, Figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Various aspects of the present invention may be appreciated from the following enumerated example embodiments (EEEs):

EEE1. A decoder (200, 201), configured to:
receive a finite bitrate stream (230) that includes a quantized latent frame (264), wherein the quantized latent frame includes a quantized representation of a current frame (t) of a signal in a latent domain different from a first domain;
generate a reconstructed latent frame (267) from the quantized latent frame;
use a generative neural network model (210) to perform a task for which the generative neural network model has been trained, wherein the task includes generating parameters (220) for an invertible mapping (268) from the latent domain to the first domain;
reconstruct a current frame of the signal (269) in the first domain, which includes mapping the reconstructed latent frame to the first domain by use of the invertible mapping, and
use the reconstructed current frame of the signal in the first domain to update a state of the generative neural network model.

EEE2. The decoder of EEE 1, wherein the generative neural network model has been trained to perform the task also based on conditioning information (265) associated with at least one of the current frame (t) and a future frame (>t).

EEE3. The decoder of EEE 1 or 2, including means configured to receive, in a same finite bitrate frame stream, the quantized latent frame and either conditioning information associated with at least one of the current frame and a future frame or an indication that such conditioning information is not included in the same finite bitrate frame stream, and wherein the decoder is configured to, if the same finite bitrate frame stream includes the indication, perform the task without the use of such conditioning information.

EEE4. The decoder of EEE 2, including means configured to receive, in a same finite bitrate frame stream, the quantized latent frame and legacy codec data, and further configured to reconstruct a signal from the legacy codec data as at least part of the conditioning information.

EEE5. The decoder of any one of EEEs 1 to 4, wherein the task includes predicting a current frame of the signal in the first domain, and wherein to generate the current frame of the signal in the first domain includes correcting the predicted current frame by use of the reconstructed latent frame mapped to the first domain.

EEE6. An encoder (100, 101, 102, 103), configured to:
receive a current frame of a signal (160) in a first domain;
use a generative neural network model (110) to perform a task for which the generative neural network model has been trained, where the task includes providing parameters (120) for an invertible mapping (161) from the first domain to a latent domain different from the first domain;
generate a latent frame (162) by mapping at least part of the current frame of the signal to the latent domain using the invertible mapping, wherein the latent frame includes a representation of the current frame (t) of the signal in the latent domain;
generate a quantized latent frame (164) based on the generated latent frame, and
generate a finite bitrate stream (130) that includes the quantized latent frame.

EEE7. The encoder of EEE 6, wherein the generative neural network has been trained to perform the task based on conditioning information (165) associated with at least one of the current frame (t) and a future frame (>t), and wherein the encoder is further configured to output a finite bitrate stream including such conditioning information.

EEE8. The encoder of EEE 6 or 7, further configured to output a same finite bitrate frame stream including the quantized latent frame and either conditioning information associated with at least one of the current frame and a future frame or an indication that such conditioning information is not included in the same finite bitrate stream.

EEE9. The encoder of any one of EEEs 6 to 8, further configured to:
generate a reconstructed latent frame (167) from the quantized latent frame;
generate a reconstructed current frame of the signal (169) in the first domain, which includes mapping the reconstructed latent frame to the first domain by use of an inverse (168) of the invertible mapping, and
use the reconstructed current frame of the signal in the first domain to update a state of the generative neural network model.

EEE10. The encoder of EEE 9, wherein the invertible mapping includes an affine transformation.

EEE11. The encoder of EEE 9 or 10, configured to generate the invertible mapping by use of a flow model.

EEE12. The encoder of any one of EEEs 6 to 11, wherein the bitrate of the finite bitrate stream that includes the quantized latent frame is allocated based on a perceptual rate allocation model (150).

EEE13. The encoder of any one of EEEs 9 to 12, wherein the bitrate of the finite bitrate stream that includes the quantized latent frame is allocated based on a difference between the received current frame of the signal in the first domain and the reconstructed current frame of the signal in the first domain.

EEE14. The encoder of any one of EEEs 6 to 13, configured to generate the quantized latent frame by use of subtractive dithering (174) followed by a gain (175).

EEE15. The encoder of any one of EEEs 6 to 14, configured to generate the quantized latent frame by selecting from a plurality of quantizers with different quantization step-sizes, including a zero-rate noise-fill.

EEE16. A method (320) of decoding a current frame of a signal, including:
receiving (S321) a finite bitrate stream (330) including a quantized latent frame (364), the quantized latent frame including a quantized representation of the current frame (t) of the signal in a latent domain different from a first domain;
generating (S322) a reconstructed latent frame (367) from the quantized latent frame;
using a generative neural network model to perform a task for which the general neural network model has been trained, the task including generating parameters for an invertible mapping from the latent domain to the first domain;

reconstructing (S323) a current frame of the signal (369) in the first domain, including mapping the reconstructed latent frame to the first domain using the invertible mapping, and using (S324) the reconstructed current frame of the signal in the first domain to update (340) a state of the generative neural network model.

EEE17. A method (310) of encoding a current frame of a signal, including:
receiving (S311) a current frame of the signal (360) in a first domain;
using a generative neural network model to perform a task for which the generative neural network model has been trained, the task including providing parameters for an invertible mapping from the first domain to a latent domain different from the first domain;
generating (S312) a latent frame (362) by mapping at least part of the current frame of the signal to the latent domain using the invertible mapping, the latent frame including a representation of the current frame of the signal in the latent domain;
generating (S313) a quantized latent frame (364) based on the generated latent frame, and
generating (S314) a finite bitrate stream (330) including the quantized latent frame.

EEE18. A non-transitory computer readable medium storing instructions operable, when executed by at least one computer processor belonging to a computer hardware, to cause the computer hardware to perform the method of decoding a current frame of a signal according to EEE 16.

EEE19. A non-transitory computer readable medium storing instructions operable, when executed by at least one computer processor belonging to a computer hardware, to cause the computer hardware to perform the method of encoding a current frame of a signal according to EEE 17.

EEE20. A coding system (400) for transferring a current frame of a signal, including at least one decoder (420) according to any one of EEEs 1 to 5, at least one encoder (410) according to any one of EEEs 6 to 15, and means (440) for transferring the finite bitrate stream (430) that includes the quantized latent frame between the encoder and the decoder.

The invention claimed is:

1. A decoder, configured to:
receive a finite bitrate stream that includes a quantized latent frame, wherein the quantized latent frame includes a quantized representation of a current frame (t) of a signal in a latent domain different from a first domain;
generate a reconstructed latent frame from the quantized latent frame;
use a generative neural network model to perform a task for which the generative neural network model has been trained, wherein the task includes generating parameters for an invertible mapping from the latent domain to the first domain;
reconstruct a current frame of the signal in the first domain, which includes mapping the reconstructed latent frame to the first domain by use of the invertible mapping, wherein the mapping uses the generated parameters to reconstruct information lost during quantization, and
use the reconstructed current frame of the signal in the first domain to update a state of the generative neural network model.

2. The decoder of claim 1, wherein the generative neural network model has been trained to perform the task also based on conditioning information associated with at least one of the current frame (t) and a future frame (>t).

3. The decoder of claim 1, including means configured to receive, in a same finite bitrate frame stream, the quantized latent frame and either conditioning information associated with at least one of the current frame and a future frame or an indication that such conditioning information is not included in the same finite bitrate frame stream, and wherein the decoder is configured to, if the same finite bitrate frame stream includes the indication, perform the task without the use of such conditioning information.

4. The decoder of claim 2, including means configured to receive, in a same finite bitrate frame stream, the quantized latent frame and legacy codec data, and further configured to reconstruct a signal from the legacy codec data as at least part of the conditioning information.

5. The decoder of claim 1, wherein the task includes predicting a current frame of the signal in the first domain, and wherein to generate the current frame of the signal in the first domain includes correcting the predicted current frame by use of the reconstructed latent frame mapped to the first domain.

6. An encoder, configured to:
receive a current frame of a signal in a first domain;
use a generative neural network model to perform a task for which the generative neural network model has been trained based on conditioning information associated with at least one of the current frame (t) and a future frame (>t), where the task includes providing parameters for an invertible mapping from the first domain to a latent domain different from the first domain;
generate a latent frame by mapping at least part of the current frame of the signal to the latent domain using the invertible mapping, wherein the latent frame includes a representation of the current frame (t) of the signal in the latent domain;
generate a quantized latent frame based on the generated latent frame, wherein the quantized latent frame conveys information from the generated latent frame for supplementing information that is not reconstructed by a decoder-side generative neural network during a reconstruction process, and
generate a finite bitrate stream that includes the quantized latent frame.

7. The encoder of claim 6, wherein the encoder is further configured to output a further finite bitrate stream including such conditioning information.

8. The encoder of claim 6, further configured to output a same finite bitrate frame stream including the quantized latent frame and either conditioning information associated with at least one of the current frame and a future frame or an indication that such conditioning information is not included in the same finite bitrate stream.

9. The encoder of claim 6, further configured to:
generate a reconstructed latent frame from the quantized latent frame;
generate a reconstructed current frame of the signal in the first domain, which includes mapping the reconstructed latent frame to the first domain by use of an inverse of the invertible mapping, and
use the reconstructed current frame of the signal in the first domain to update a state of the generative neural network model.

10. The encoder of claim 9, wherein the invertible mapping includes an affine transformation.

11. The encoder of claim 9, configured to generate the invertible mapping by use of a flow model.

12. The encoder of claim 6, wherein the bitrate of the finite bitrate stream that includes the quantized latent frame is allocated based on a perceptual rate allocation model (150).

13. The encoder of claim 9, wherein the bitrate of the finite bitrate stream that includes the quantized latent frame is allocated based on a difference between the received current frame of the signal in the first domain and the reconstructed current frame of the signal in the first domain.

14. The encoder of claim 6, configured to generate the quantized latent frame by use of subtractive dithering followed by a gain.

15. The encoder of claim 6, configured to generate the quantized latent frame by selecting from a plurality of quantizers with different quantization step-sizes, including a zero-rate noise-fill.

16. A method of decoding a current frame of a signal, including:
  receiving a finite bitrate stream including a quantized latent frame, the quantized latent frame including a quantized representation of the current frame (t) of the signal in a latent domain different from a first domain;
  generating a reconstructed latent frame from the quantized latent frame;
  using a generative neural network model to perform a task for which the generative neural network model has been trained, the task including generating parameters for an invertible mapping from the latent domain to the first domain;
  reconstructing a current frame of the signal in the first domain, including mapping the reconstructed latent frame to the first domain using the invertible mapping, wherein the mapping uses the generated parameters to reconstruct information lost during quantization, and using the reconstructed current frame of the signal in the first domain to update a state of the generative neural network model.

17. A method of encoding a current frame of a signal, including:
  receiving a current frame of the signal in a first domain;
  using a generative neural network model to perform a task for which the generative neural network model has been trained task based on conditioning information associated with at least one of the current frame (t) and a future frame (>t), the task including providing parameters for an invertible mapping from the first domain to a latent domain different from the first domain;
  generating a latent frame by mapping at least part of the current frame of the signal to the latent domain using the invertible mapping, the latent frame including a representation of the current frame of the signal in the latent domain;
  generating a quantized latent frame based on the generated latent frame, wherein the quantized latent frame conveys information from the generated latent frame for supplementing information that is not reconstructed by a decoder-side generative neural network during a reconstruction process; and
  generating a finite bitrate stream including the quantized latent frame and such conditioning information.

18. A non-transitory computer readable medium storing instructions operable, when executed by at least one computer processor belonging to a computer hardware, to cause the computer hardware to perform the method of decoding a current frame of a signal according to claim 16.

19. A non-transitory computer readable medium storing instructions operable, when executed by at least one computer processor belonging to a computer hardware, to cause the computer hardware to perform the method of encoding a current frame of a signal according to claim 17.

* * * * *